(12) United States Patent
Kwon et al.

(10) Patent No.: US 10,442,262 B2
(45) Date of Patent: Oct. 15, 2019

(54) HYBRID ARM AND METHOD OF MANUFACTURING SAME

(71) Applicant: ILJIN CO., LTD., Gyeongju-si (KR)

(72) Inventors: Tae-Sung Kwon, Gyeongju-si (KR); Sung-Geun Lee, Seoul (KR); Byong Suk Yu, Gyeongju-si (KR); Se Woong Jeong, Ulsan (KR); Hyun-Woo Kim, Seoul (KR); Hyuk Kwon, Seoul (KR); Ig-Jin Kwon, Gyeongju-si (KR); Young In Yoon, Ulsan (KR); Min Kook Park, Daegu (KR); Soon Chan Kwon, Gimcheon-si (KR)

(73) Assignee: ILJIN CO., LTD., Gyeongju-si (KR)

( * ) Notice: Subject to any disclaimer, the term of this patent is extended or adjusted under 35 U.S.C. 154(b) by 85 days.

(21) Appl. No.: 15/569,951

(22) PCT Filed: Nov. 24, 2015

(86) PCT No.: PCT/KR2015/012629
§ 371 (c)(1),
(2) Date: Oct. 27, 2017

(87) PCT Pub. No.: WO2016/175417
PCT Pub. Date: Nov. 3, 2016

(65) Prior Publication Data
US 2018/0154719 A1 Jun. 7, 2018

(30) Foreign Application Priority Data

Apr. 29, 2015 (KR) .................. 10-2015-0060779

(51) Int. Cl.
*B60G 7/00* (2006.01)
*B29C 45/14* (2006.01)
(Continued)

(52) U.S. Cl.
CPC .............. *B60G 7/001* (2013.01); *B29C 45/14* (2013.01); *B60G 7/00* (2013.01); *B60G 7/005* (2013.01);
(Continued)

(58) Field of Classification Search
CPC .......... B60G 7/001; B60G 7/005; B60G 7/02; B60G 7/00; B60G 2206/7104;
(Continued)

(56) References Cited

U.S. PATENT DOCUMENTS

| 3,561,800 | A | * | 2/1971 | Hassan | ............... F16C 11/0609 384/203 |
| 5,662,348 | A | | 9/1997 | Kusama et al. | |

(Continued)

FOREIGN PATENT DOCUMENTS

| CN | 102007309 | 4/2011 |
| CN | 102753847 | 10/2012 |

(Continued)

OTHER PUBLICATIONS

Supplementary European Search Report, issued in the corresponding European patent application No. 15890858.2, dated Nov. 20, 2018, 13 pages.

(Continued)

*Primary Examiner* — Drew J Brown
(74) *Attorney, Agent, or Firm* — Hamre, Schumann, Mueller & Larson, P.C.

(57) ABSTRACT

A hybrid arm according to an embodiment of the present disclosure may include: a first body made of a metal material and formed with a plurality of end portions; a second body formed so as to fill an inner side of the first body by being insert-injection-molded to the first body; and a ball joint formed integrally at a first end portion among the plurality of end portions of the first body. The ball joint may include:

(Continued)

a reinforcement member coupled to the first end portion; a bearing member formed with a space therein; a ball stud including a ball rotatably inserted into the space of the bearing member and a rod extending upward of the ball; and a housing interposed between the reinforcement member and the bearing member and formed integrally with the second body.

12 Claims, 6 Drawing Sheets

(51) Int. Cl.
| | | |
|---|---|---|
| B60G 7/02 | (2006.01) | |
| F16D 3/22 | (2006.01) | |
| F16C 11/06 | (2006.01) | |
| B29L 31/30 | (2006.01) | |

(52) U.S. Cl.
CPC ............... *B60G 7/02* (2013.01); *F16C 11/06* (2013.01); *F16D 3/22* (2013.01); *B29L 2031/30* (2013.01); *B60G 2200/154* (2013.01); *B60G 2204/416* (2013.01); *B60G 2204/418* (2013.01); *B60G 2206/014* (2013.01); *B60G 2206/122* (2013.01); *B60G 2206/70* (2013.01); *B60G 2206/7104* (2013.01); *B60G 2206/81012* (2013.01); *B60G 2206/8201* (2013.01); *B60Y 2304/03* (2013.01)

(58) Field of Classification Search
CPC ........ B60G 2206/014; B60G 2204/418; B60G 2206/70; B60G 2206/81012; B60G 2206/8201; B60G 2200/154; B60G 2204/416; B60G 2206/122; B29C 45/14; F16C 11/06; F16D 3/22; B29L 2031/30; B60Y 2304/03
See application file for complete search history.

(56) References Cited

U.S. PATENT DOCUMENTS

| | | | | |
|---|---|---|---|---|
| 6,109,816 A | * | 8/2000 | Iwasaki | ............... B60G 7/005 403/122 |
| 7,357,591 B2 | * | 4/2008 | Broker | ............... F16C 11/0614 403/122 |
| 7,661,902 B2 | * | 2/2010 | Brunneke | ............ F16C 11/0628 403/141 |
| 8,152,186 B2 | | 4/2012 | Jeong | |
| 8,196,940 B2 | | 6/2012 | Jeong | |
| 8,267,415 B2 | | 9/2012 | Jeong | |
| 2003/0170069 A1 | * | 9/2003 | Suzuki | ............... B21C 23/205 403/122 |
| 2004/0057781 A1 | * | 3/2004 | Bohne | ............... F16C 11/0638 403/135 |
| 2005/0013657 A1 | * | 1/2005 | Kondoh | ............... B62D 7/166 403/122 |
| 2008/0193208 A1 | | 8/2008 | Nordloh et al. | |
| 2011/0033226 A1 | | 2/2011 | Kuroda | |
| 2011/0133422 A1 | | 6/2011 | Jeong | |
| 2011/0133423 A1 | | 6/2011 | Jeong | |
| 2011/0133425 A1 | * | 6/2011 | Jeong | .................... B60G 7/001 280/124.134 |
| 2012/0141192 A1 | | 6/2012 | Kwon | |
| 2012/0301213 A1 | | 11/2012 | Kuroda et al. | |
| 2014/0199113 A1 | | 7/2014 | Nordloh et al. | |
| 2019/0030972 A1 | * | 1/2019 | Mainz | .................... B60G 7/001 |

FOREIGN PATENT DOCUMENTS

| | | |
|---|---|---|
| DE | 102011003971 | 8/2012 |
| EP | 0733499 | 9/1996 |
| EP | 1346855 | 9/2003 |
| EP | 1460289 | 9/2004 |
| EP | 2465713 | 6/2012 |
| JP | 08-318722 | 12/1996 |
| JP | 2011-116339 | 6/2011 |
| KR | 10-2008-0036990 | 4/2008 |
| KR | 10-2011-0015816 | 2/2011 |
| KR | 10-2011-0063164 | 6/2011 |
| KR | 10-2011-0063173 | 6/2011 |
| KR | 10-2011-0063179 | 6/2011 |

OTHER PUBLICATIONS

International Search Report, issued in the corresponding PCT Application No. PCT/KR2015/012629, dated Jan. 27, 2016, 4 pages.

First Chinese Office Action, issued in the corresponding Chinese patent application No. 2015800792728, dated Mar. 4, 2019, 3 pages.

* cited by examiner

HYBRID ARM AND METHOD OF MANUFACTURING SAME

TECHNICAL FIELD

The present disclosure relates to a hybrid arm and a method of manufacturing the same. More particularly, the present disclosure relates to a hybrid arm in which a ball joint is integrally formed, and a method of manufacturing the hybrid arm.

BACKGROUND

Generally, a vehicular suspension system is an apparatus for connecting a wheel to a vehicular body. The suspension system consists of a spring that absorbs impact from a road surface, a shock absorber that adjusts an action of the spring, an arm or link that controls an operation of the wheel, and a stabilizer that prevents rolling of a vehicle.

The aforementioned vehicular suspension system is an important apparatus for promoting ride comfort and driving stability, and mainly performs the functions of suppressing or rapidly reducing vibrations transmitted from a vehicular wheel while stably supporting the vehicular body from the vehicular wheel in a stable manner.

In such a suspension system, a lower arm is used to perform the functions of connecting the vehicular wheel to the vehicular body and supporting the vehicular wheel.

FIG. 8 is a perspective view of a lower arm according to a prior art technology.

As shown in FIG. 8, a lower arm 1 according to a prior art technology is configured in a structure where a vehicular body mounting bush 10 (commonly referred to as an "A bush" in the art), a damping joint 20 (commonly referred to as a "G bush" in the art), and a ball joint 30 are coupled to three end portions.

In this regard, the vehicular body mounting bush 10 and the damping joint 20 are coupled to a vehicular body frame 2 through respective assembly bolts 41 and 42, and the ball joint 30 is coupled to a knuckle of the vehicular wheel to support the vehicular wheel together with an upper arm.

The damping joint 20 simultaneously prevents, among random excitations transmitted from the outside of a vehicle, the following: an impact harshness phenomenon which is a temporary vibration generated after an impact sound when a tire of the vehicle passes over a protrusion of a road surface while the vehicle is being driven; a shimmy phenomenon in which the steering wheel of the vehicle that is turning shakes left and right in the turning direction; and a judder phenomenon in which noise or vibration is generated in the steering wheel or a dash panel when a braking force is applied while the vehicle is driven at a high speed.

FIG. 9 is a sectional view of a ball joint according to a prior art technology.

As shown in FIG. 9, the ball joint 30 according to prior art includes a housing 31, a bearing 32, a cap 33, a ball stud 34, and a dust cover 35.

The housing 31 is generally formed of a metal material for maintaining a strength of a ball bearing, and upper and lower ends of the housing are open. A deformed portion 38 is formed integrally at the lower end of the housing 31.

The bearing 32 is mounted inside the housing 31 and is generally made of a plastic material. An upper end of the bearing 32 is open, and a space is formed in the bearing 32 such that a ball 39 of the ball stud 34 is inserted in the space.

The cap 33 supports a lower portion of the bearing 32 and closes the lower end of the housing 31. That is, the bearing 32 is positioned inside the housing 31 and the lower end of the housing 31 is closed by the cap 33. At this time, the deformed portion 38 of the housing 31 protrudes below the cap 33. To assemble the cap 33 to the housing 31, the deformed portion 38 is caulked toward the cap 33.

The ball 39, which is inserted into and pivoted in the space of the bearing 32, is formed at one end of the ball stud 34. Screw threads 37 are formed at the opposite end of the ball stud 34.

The dust cover 35 prevents foreign matters from entering between the bearing 32 and the ball 39. The dust cover 35 is generally made of an elastic material such as rubber. The dust cover 35 is inserted to the ball stud 34 and is mounted to an upper portion of the housing 31. Further, the dust cover 35 includes fixing members 36 which fix upper and lower ends of the dust cover 35.

However, in the above-described ball joint of the prior art, the housing is made of a metal material by casting and had to be used by polishing the surfaces of the housing. Further, additional parts for assembling the ball joint must be used and thus the weight of the ball joint was increased. Accordingly, the weight of a vehicle in which several to dozens of ball joints are used is increased, thereby reducing the fuel efficiency of the vehicle. In addition, the prior art ball joint was required to undergo an additional assembly process of press-fitting the ball joint to the lower arm. Thus, there have been problems due to an increased manufacturing time and manufacturing costs.

SUMMARY

Therefore, the present disclosure has been devised to solve the aforementioned problems, and the object of the present disclosure is to provide a hybrid arm in which a ball joint is integrally formed by insert-injection-molding a second body and a housing to a first body to which a reinforcement member is coupled, and a method of manufacturing such a hybrid arm.

A hybrid arm according to an embodiment of the present disclosure may include: a first body made of a metal material and formed with a plurality of end portions; a second body formed so as to fill an inner side of the first body by being insert-injection-molded to the first body; and a ball joint formed integrally at a first end portion among the plurality of end portions of the first body. The ball joint may include: a reinforcement member coupled to the first end portion; a bearing member formed with a space therein; a ball stud including a ball rotatably inserted into the space of the bearing member and a rod extending upward of the ball; and a housing interposed between the reinforcement member and the bearing member and formed integrally with the second body.

A through-hole portion may be formed in the reinforcement member to face the inner side of the first body to allow molten plastic to pass through.

A concave portion may be formed in an inner circumferential surface of the reinforcement member along a circumferential direction.

The bearing member may include a first bearing and a second bearing. A first protrusion portion, the inner circumferential surface of which protrudes upward, may be formed in one of the first and second bearings. A second protrusion portion, which corresponds to the first protrusion portion and the outer circumferential surface of which protrudes downward, may be formed in the other one of the first and second bearings.

The housing may be formed by insert-injection-molding the reinforcement member and the bearing member with molten plastic, and the housing may support an outer circumferential surface of the bearing member and may surround an inner circumferential surface and an outer circumferential surface of the reinforcement member.

An edge of the first body may extend downward to form first and second lateral reinforcement portions. A lower end of the first lateral reinforcement portion may extend toward the inner side of the first body to form a first extension portion. A lower end of the second lateral reinforcement portion may extend toward the inner side of the first body to form a second extension portion. The first and second extension portions may be formed in a shape that gradually increases in area toward the reinforcement member.

A first circular arc portion corresponding to the outer circumferential surface of the reinforcement member may be formed at the first end portion of the first body. A first bonding portion may be formed at one side of the first lateral reinforcement portion so as to contact the outer circumferential surface of the reinforcement member. A second circular arc portion corresponding to the outer circumferential surface of the reinforcement member may be formed at one side of the first extension portion. A second bonding portion may be formed at one side of the second lateral reinforcement portion so as to contact the outer circumferential surface of the reinforcement member. A third circular arc portion corresponding to the outer circumferential surface of the reinforcement member may be formed at one side of the second extension portion.

The reinforcement member may be welded to the first circular arc portion, the first bonding portion, the second circular arc portion, the second bonding portion, and the third circular arc portion.

The second body may be formed so as to surround inward and outward surfaces of the first and second lateral reinforcement portions and inward and outward surfaces of the first and second extension portions.

The second body may be made of a material different from the first body, and a plurality of reinforcement ribs extending downward may be provided in an inner side of the second body.

A plurality of button holes may be formed in the first body. When the second body is insert-injection-molded to the first body, a plurality of button portions integrally coupled to the plurality of button holes may be formed.

A method of manufacturing a hybrid arm according to an embodiment of the present disclosure may include: forming a first body by processing a metal plate material; coupling a reinforcement member to a first end portion of the first body; fixing a rod of a ball stud such that an outer circumferential surface of a bearing member is spaced apart from an inner circumferential surface of the reinforcement member; and insert-injection-molding a second body and a housing of a ball joint to the first body.

A through-hole portion may be formed in the reinforcement member to allow molten plastic to pass through. Coupling the reinforcement member to the first end portion of the first body may include welding the reinforcement member to the first end portion of the first body such that the through-hole portion faces the inner side of the first body.

Forming the first body by processing the metal plate material may include: forming first and second lateral reinforcement portions extending downward of the first body by processing an edge of the metal plate material; and forming first and second extension portions by processing lower ends of the first and second lateral reinforcement portions.

According to the above-described embodiments of the present disclosure, the ball joint may be integrally formed in the hybrid arm by insert-injection-molding the second body and the housing to the first body to which the reinforcement member is coupled. Accordingly, the process of assembling the ball joint is eliminated, thereby improving productivity and reducing manufacturing costs. Further, since a separate cap component for the ball joint is not necessary, weight of the hybrid arm can be reduced.

DETAILED DESCRIPTION

Hereinafter, detailed descriptions are made as to embodiments of the present disclosure with reference to the accompanying drawings such that those of ordinary skill in the technical field to which the present disclosure pertains can easily carry out the embodiments. However, the present disclosure is not limited to the embodiments described herein, but may be embodied in other forms.

A hybrid arm and a method of manufacturing the same according to embodiments of the present disclosure described below are applicable to all arm members to which a ball joint for a vehicle is mounted. In the descriptions below, a lower arm for a vehicle is described as an embodiment.

Figure 1:
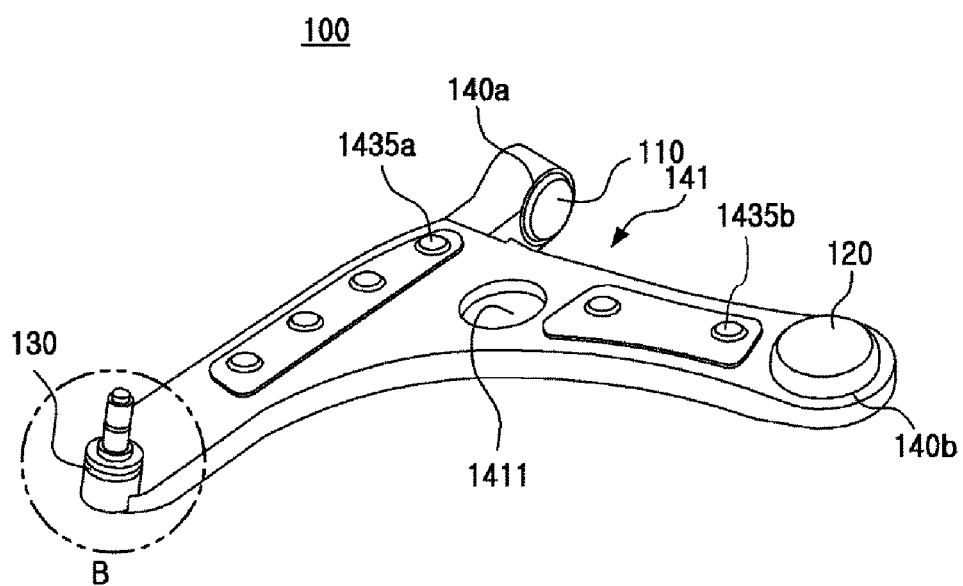
FIG. 1 is a front perspective view of a hybrid arm according to an embodiment of the present disclosure.
Figure 2:
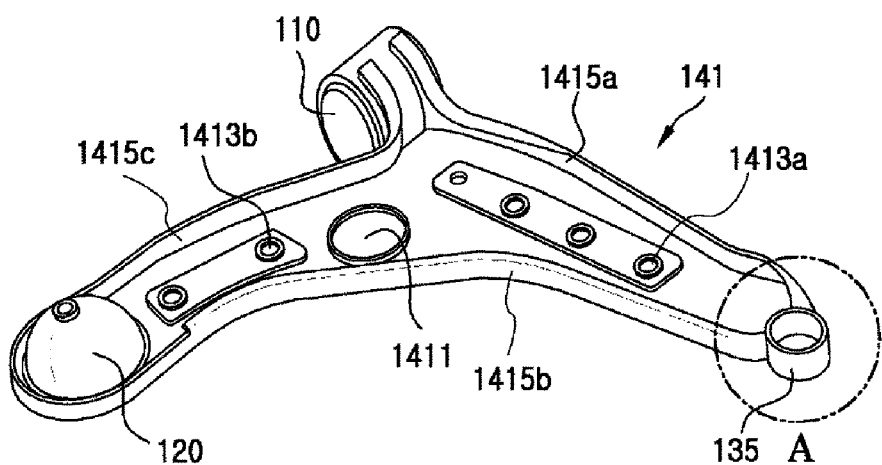
FIG. 2 is a bottom perspective view of a first body according to an embodiment of the present disclosure.
Figure 3:
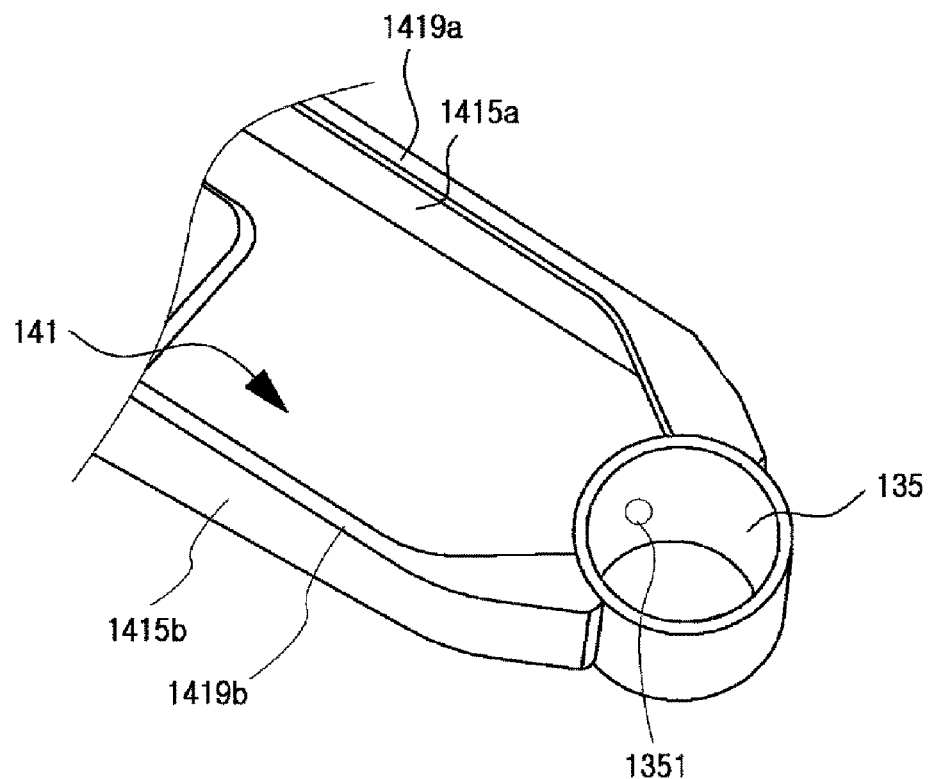
FIG. 3 shows part A of FIG. 2.
Figure 4:
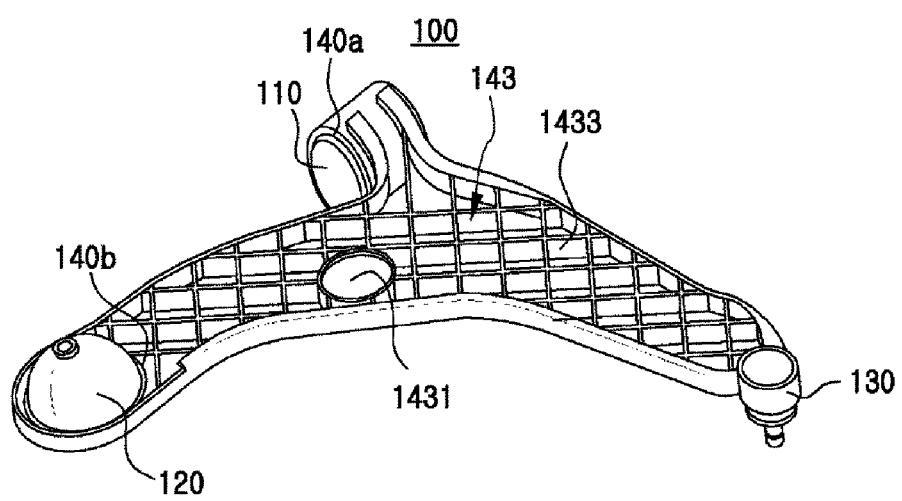
FIG. 4 is a bottom perspective view of a hybrid arm according to an embodiment of the present disclosure.
Figure 5:
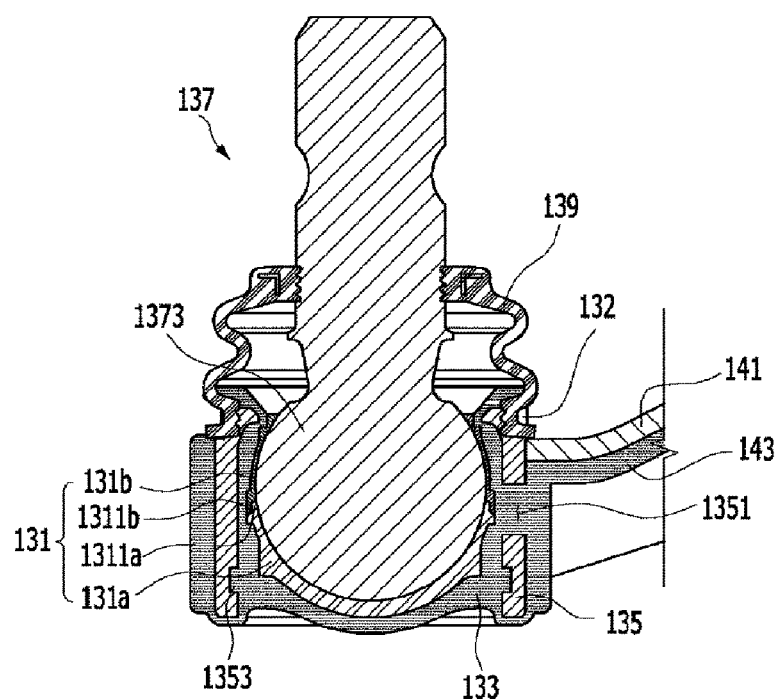
FIG. 5 is a sectional view showing part B of FIG. 1.
Figure 6:
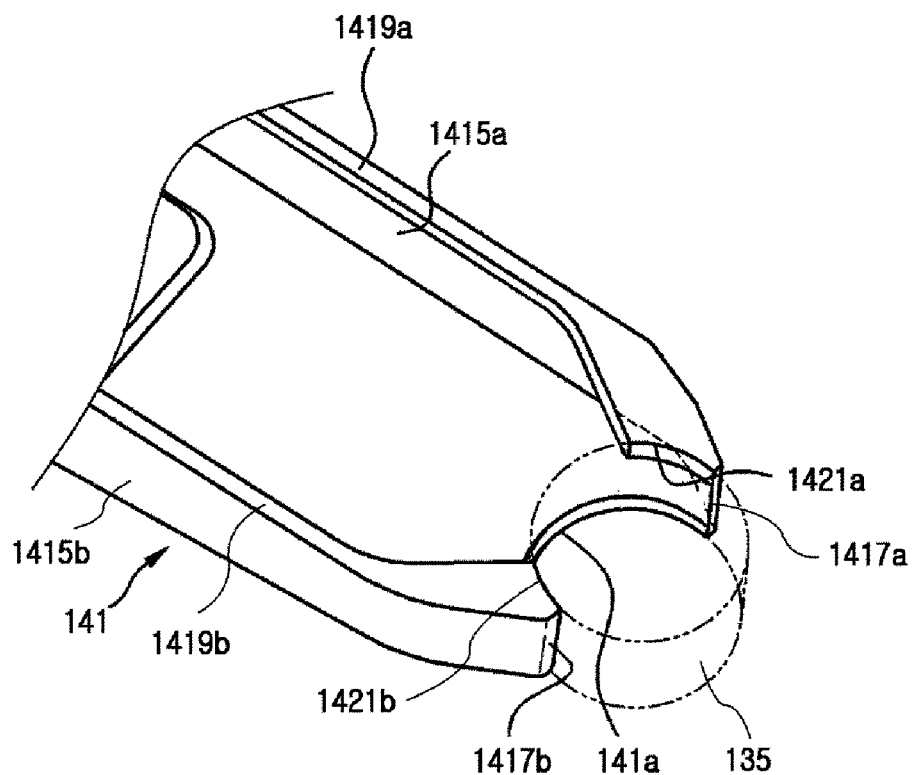
FIG. 6 illustrates a coupling between a first body and a reinforcement member according to an embodiment of the present disclosure.
Figure 7:
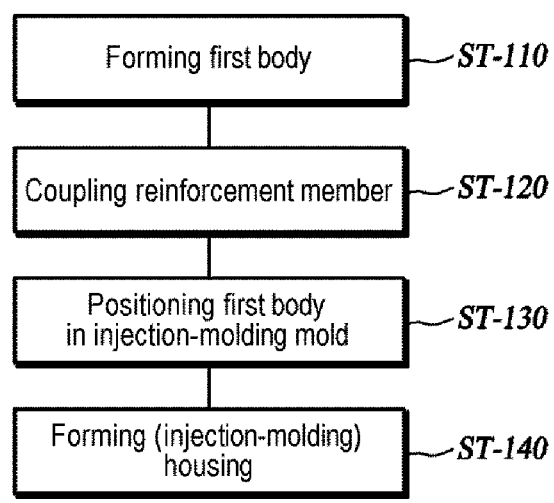
FIG. 7 is a flowchart of a method of manufacturing a hybrid arm according to an embodiment of the present disclosure.
Figure 8:
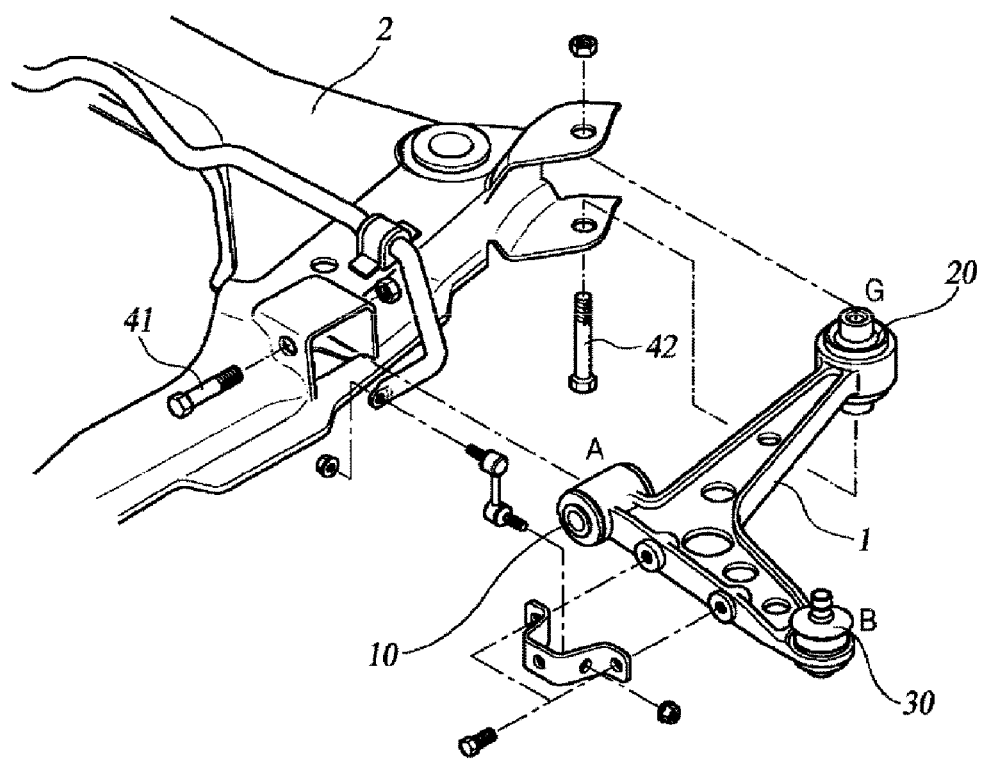
FIG. 8 is a perspective view of a lower arm according to a prior art technology.
Figure 9:
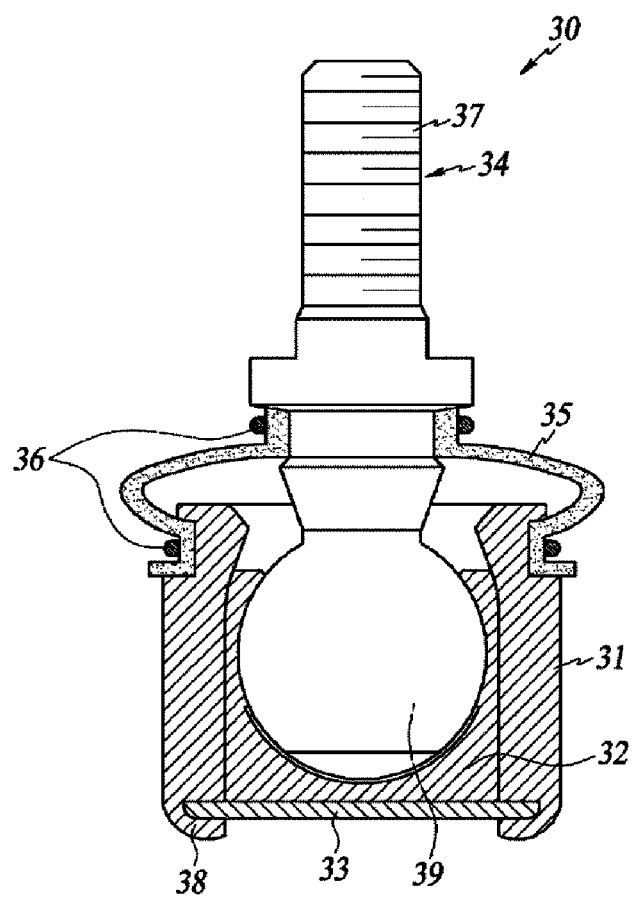
FIG. 9 is a sectional view of a ball joint according to a prior art technology.

FIG. 1 is a front perspective view of a hybrid arm according to an embodiment of the present disclosure. FIG. 2 is a bottom perspective view of a first body according to an embodiment of the present disclosure. FIG. 3 shows part A of FIG. 2. FIG. 4 is a bottom perspective view of a hybrid arm according to an embodiment of the present disclosure. FIG. 5 is a sectional view showing part B of FIG. 1. FIG. 6 illustrates a coupling between a first body and a reinforcement member according to an embodiment of the present disclosure. FIG. 7 is a flowchart of a method of manufacturing a hybrid arm according to an embodiment of the present disclosure. FIG. 8 is a perspective view of a lower arm according to a prior art technology. FIG. 9 is a sectional view of a ball joint according to a prior art technology.

In the descriptions below, for ease of description, with respect to FIG. 1 as a reference, a side of a hybrid arm 100 where the hybrid arm 100 is connected to a knuckle of a vehicular wheel is referred to as "one side," while a side of the hybrid arm 100 where the hybrid arm 100 is connected to a vehicular body frame when the hybrid arm 100 is installed on the vehicular body frame is referred to as the "opposite side." A direction from the hybrid arm 100 toward the ground is referred to as "downward," while a direction opposite thereto is referred to as "upward." A direction in which a vehicle equipped with the hybrid arm 100 advances is referred to as "forward," while a direction opposite thereto is referred to as "rearward."

Hereinafter, the hybrid arm 100 according to an embodiment of the present disclosure is described in detail with reference to FIGS. 1 to 6.

As shown in FIGS. 1 to 6, the hybrid arm 100 according to an embodiment of the present disclosure may include a first body 141, a second body 143, and a ball joint 130 formed integrally at one end portion of the first body 141.

The first body 141 is made of a metal material. The first body 141 is formed approximately in a shape of "λ." The first body 141 is formed approximately in a plate-like shape.

The first body 141 is formed with three end portions. A first end portion is formed at one side of the first body 141, and second and third end portions are formed at the opposite sides of the first body. The second end portion is formed further forward than the third end portion.

A ball joint 130 is formed integrally at the first end portion of the first body 141. The hybrid arm 100 may be connected to the knuckle of a vehicular wheel via the ball joint 130. To form the first body 141 and the ball joint 130 integrally together, a reinforcement member 135 is coupled to the first end portion of the first body 141. The reinforcement member 135 is formed in a cylindrical shape in which the upper and lower ends are both open. A first circular arc portion 141a, which corresponds to an outer circumferential surface of the reinforcement member 135, is formed at the first end portion of the first body 141. The first circular arc portion 141a is recessed so as to be in contact with the outer circumferential surface of the reinforcement member 135. A center of the circular arc shape of the first circular arc portion 141a may be located on a central axis of the reinforcement member 135.

A bush hole 140a is formed at the second end portion of the first body 141. A mounting bush 110 may be inserted into the bush hole 140a so as to be connected to a vehicular body frame.

A damping joint hole 140b is formed at the third end portion of the first body 141. A damping joint 120 may be inserted into the damping joint hole 140b so as to be connected to the vehicular body frame.

A shock-absorber hole 1411 is formed to perforate the first body 141 in a vertical direction among the three end portions of the first body 141. A shock absorber may be inserted into and installed in the shock-absorber hole 1411.

A plurality of first button holes 1413a are formed between the first end portion and the second end portion and are spaced apart from one another by a predetermined spacing. A plurality of first button portions 1435a are integrally coupled to the plurality of first button holes 1413a. The plurality of first button portions 1435a may be formed by injecting molten plastic into the plurality of first button holes 1413a.

A plurality of second button holes 1413b may be formed between the second end portion and the third end portion. A plurality of second button portions 1435b are integrally coupled in the plurality of second button holes 1413b. The plurality of second button portions 1435b may be formed by injecting molten plastic into the plurality of second button holes 1413b.

An edge of the first body 141 extends downward to form first, second, and third lateral reinforcement portions 1415a, 1415b, and 1415c. The first, second, and third lateral reinforcement portions 1415a, 1415b, and 1415c may be integrally formed by bending the edge of the first body 141 downward. The first, second, and third lateral reinforcement portions 1415a, 1415b, and 1415c may constitute lateral surfaces of the first body 141.

Hereinafter, a direction toward a portion surrounded by the first, second, and third lateral reinforcement portions 1415a, 1415b, and 1415c is referred to as "inward" of the first body 141, while a direction opposite thereto is referred to as "outward" of the first body 141.

The first lateral reinforcement portion 1415a is formed between the first end portion and the second end portion of the first body 141. A first bonding portion 1417a is formed at one side of the first lateral reinforcement portion 1415a to be in contact with the outer circumferential surface of the reinforcement member 135.

A lower end of the first lateral reinforcement portion 1415a extends inward of the first body 141 to form a first extension portion 1419a. The lower end of the first lateral reinforcement portion 1415a may be bent inward of the first body 141. A sectional shape of the first lateral reinforcement portion 1415a and the first extension portion 1419a may be formed in an "L" shape. A second circular arc portion 1421a, which corresponds to the outer circumferential surface of the reinforcement member 135, is formed at one side of the first extension portion 1419a. The second circular arc portion 1421a is recessed so as to be in contact with the outer circumferential surface of the reinforcement member 135. A center of the circular arc shape of the second circular arc portion 1421a may be located on the central axis of the reinforcement member 135. A radius of curvature of the second circular arc portion 1421a may be the same as a radius of curvature of the first circular arc portion 141a. The first and second circular arc portions 141a and 1421a are spaced apart from each other. The first extension portion 1419a may be formed in a shape that gradually increases in area toward the reinforcement member 135.

The second lateral reinforcement portion 1415b is formed between the first end portion and the third end portion of the first body 141. A second bonding portion 1417b is formed at one side of the second lateral reinforcement portion 1415b to be in contact with the outer circumferential surface of the reinforcement member 135.

A lower end of the second lateral reinforcement portion 1415b extends inward of the first body 141 to form a second extension portion 1419b. A third circular arc portion 1421b, which corresponds to the outer circumferential surface of the reinforcement member 135, is formed at one side of the second extension portion 1419b. The third circular arc portion 1421b is recessed so as to be in contact with the outer circumferential surface of the reinforcement member 135. A center of the circular arc shape of the third circular arc portion 1421b may be located on the central axis of the reinforcement member 135. A radius of curvature of the third circular arc portion 1421b may be the same as the radius of curvature of the first circular arc portion 141a. The first and third circular arc portions 141a and 1421b are spaced apart from each other. The second extension portion 1419b may be formed in a shape that gradually increases in area toward the reinforcement member 135.

The third lateral reinforcement portion 1415c is formed between the second end portion and the third end portion of the first body 141. A lower end of the third lateral reinforcement portion 1415c extends inward of the first body 141 to form a third extension portion 1419c.

The second body 143 may be made of a plastic material. For example, the second body 143 may be formed of Glass Fiber Reinforced Plastic (GFRP). The second body 143 may be formed approximately in the shape of "λ" by being insert-injection-molded to the first body 141.

A shock-absorber hole 1431 corresponding to the shock-absorber hole 1411 of the first body 141 is formed in the second body 143 to perforate the second body 143 in the vertical direction.

The second body 143 is formed to fill the inside of the first body 141. The second body 143 may be formed so as to surround inward surfaces of the first, second, and third lateral reinforcement portions 1415a, 1415b, and 1415c and inward surfaces of the first, second, and third extension portions 1419a, 1419b and 1419c. Alternatively, the second body 143 may be formed so as to surround inward and outward surfaces of the first, second, and third lateral reinforcement portions 1415a, 1415b and 1415c and inward and outward surfaces of the first, second, and third extension portions 1419a, 1419b and 1419c. The first, second and third extension portions 1419a, 1419b, and 1419c extend inward of the first body 141. Thus, in the case where the second body 143 is formed so as to surround the inward and outward surfaces of the first, second, and third lateral reinforcement portions 1415a, 1415b, and 1415c, and the inward and outward surfaces of the first, second, and third extension portions 1419a, 1419b and 1419c, the first body 141 and the second body 143 can be firmly coupled to each other. That is, it is possible to prevent the second body 143 from being separated from the first body 141. Further, when an impact is applied from the front by a chipping phenomenon while the vehicle is being driven, the second body 143 may prevent the first lateral reinforcement portion 1415a of the first body 141 from being damaged.

A plurality of reinforcement ribs 1433 extending downward may be provided in the inside of the second body 143. The plurality of reinforcement ribs 1433 may intersect each other and be configured in the form of a lattice. Both sides of the reinforcement ribs 1433 are coupled to the inward surfaces of the first, second, and third lateral reinforcement portions 1415a, 1415b and 1415c. For example, when one side of the reinforcement rib 1433 is coupled to the first lateral reinforcement portion 1415a, the opposite side is coupled to the second lateral reinforcement portion 1415b or the third lateral reinforcement portion 1415c. The plurality of reinforcement ribs 1433 support the first, second, and third lateral reinforcement portions 1415a, 1415b, and 1415c, thereby preventing the first body 141 from bending due to an external force.

The second body 143 may be made of a material different from the first body 141. When the second body 143 is made of a material different from the first body 141, a volume ratio of the first body 141 may be in a range between 10% to 99%.

The plurality of first button portions 1435a and the plurality of second button portions 1435b may be formed when the second body 143 is insert-injection-molded to the first body 141. Since the plurality of first button portions 1435a and the plurality of second button portions 1435b are integrally coupled to the plurality of first button holes 1413a and the plurality of second button holes 1413b, it is possible to prevent the second body 143 from being separated from or shaken with respect to the first body 141.

As shown in FIG. 5, the ball joint 130 may include the reinforcement member 135, a ball stud 137, a bearing member 131, and a housing 133.

The reinforcement member 135 is formed in a cylindrical shape. The reinforcement member 135 may be made of a metal material. The reinforcement member 135 is coupled to the first end portion of the first body 141. Specifically, the reinforcement member 135 may be welded to the first circular arc portion 141a, the first bonding portion 1417a, the second circular arc portion 1421a, the second bonding portion 1417b, and the third circular arc portion 1421b.

A through-hole portion 1351 is formed in the reinforcement member 135 to face the inner side of the first body 141 such that molten plastic can pass through the through-hole portion. Molten plastic flows into a mold for the housing 133 through the through-hole portion 1351, and the housing 133 surrounding the reinforcement member 135 can be formed thereby.

A concave portion 1353 may be formed in the inner circumferential surface of the reinforcement member 135. For example, the concave portion 1353 may be formed along a circumferential direction in the inner circumferential surface of the lower end of the reinforcement member 135. When the housing 133 is insert-injection-molded, molten plastic may be inserted into and solidified in the concave portion 1353, thus increasing the coupling force between the reinforcement member 135 and the housing 133.

A ball 1373 is formed at a lower end of the ball stud 137, and a rod 1371 having a circular pillar shape is formed integrally at an upper portion of the ball. The ball 1373 has a spherical shape, and the rod 1371 extends upward of the ball 1373.

The bearing member 131 is formed in a cup shape having a space formed therein. The space has a shape of a sphere having a size similar to a size of the ball 1373. An upper end of the bearing member 131 is open, and a lower end thereof is closed. The ball 1373 of the ball stud 137 is rotatably inserted into the space of the bearing member 131. The bearing member 131 may be made of a lubricating plastic material.

The bearing member 131 may include a first bearing 131a and a second bearing 131b. The first bearing 131a may be formed in a cup shape having an open upper end and a closed lower end. The second bearing 131b may be formed in an annular shape having upper and lower ends that are both open.

A first protrusion portion 1311a, an inner circumferential surface of which protrudes upward, is formed at an upper end of the first bearing 131a. A second protrusion portion 1311b, which corresponds to the first protrusion portion 1311a and an outer circumferential surface of which protrudes downward, is formed at a lower end of the second bearing 131b.

When the first and second bearings 131a and 131b are coupled to each other, the first protrusion portion 1311a is brought into close contact with the second protrusion portion 1311b, thus preventing the molten plastic from infiltrating the inside of the bearing member 131. Further, since the first and second bearings 131a and 131b are coupled to each other to form the bearing member 131, the ball 1373 of the ball stud 137 does not need to be press-fitted into the inner space of the bearing member 131. Thus, it is possible to prevent the bearing member 131 from being damaged.

The housing 133 is formed integrally with the second body 143. The housing may be interposed between the reinforcement member 135 and the bearing member 131 to support an outer circumferential surface of the bearing member 131. The housing 133 may be formed by insert-injection-molding the reinforcement member 135 and the bearing member 131 with molten plastic. That is, the housing 133 may be formed simultaneously with the second body 143. The housing 133 may be provided so as to surround both inner and outer circumferential surfaces of the reinforcement member 135.

A dust cover 139 may be mounted to an upper end of the housing 133 in order to prevent foreign matters such as dust or water from infiltrating between the bearing member 131 and the ball 1373. The dust cover 139 may be made of a rubber material. The dust cover 139 may be fixed to the upper end of the housing 133 by a fixing member 132.

Hereinafter, a method of manufacturing a hybrid arm according to an embodiment of the present disclosure is described with reference to FIG. 7.

The first body 141 is formed by processing a metal plate material, which is the material of the first body 141 (ST 110). The first, second, and third lateral reinforcement portions 415a, 1415b, and 1415c are formed by press working edges of the metal plate material. When the first, second, and third lateral reinforcement portions 415a, 1415b and 1415c are formed, the first, second, and third extension portions 1415a, 1415b, and 1415c are formed by processing the lower ends of the first, second, and third lateral reinforcement portions 415a, 1415b, and 1415c. Further, the shock-absorber hole 1411, the plurality of first button holes 1413a, and the plurality of second button holes 1413b are formed.

When the first body 141 is formed, the reinforcement member 135 is coupled to the first end portion of the first body 141 (ST 120). Specifically, the reinforcement member 135 may be welded to the first circular arc portion 141a, the first bonding portion 1417a, the second circular arc portion 1421a, the second bonding portion 1417b, and the third circular arc portion 1421b. At this time, the reinforcement member 135 may be coupled to the first body 141 such that the through-hole portion 1351 of the reinforcement member 135 faces the inner side of the first body 141.

When the reinforcement member 135 is coupled to the first body 141, the first body 141 is positioned in a pre-made injection-molding mold (ST 130). The bearing member 131, to which the ball stud 137 is coupled, is inserted into the reinforcement member 135. The rod 1371 of the ball stud 137 is fixed such that the outer circumferential surface of the bearing member 131 is spaced apart from the inner circumferential surface of the reinforcement member 135. Accordingly, a space, into which molten plastic can flow, may be formed between the outer circumferential surface of the bearing member 131 and the inner circumferential surface of the reinforcement member 135.

Thereafter, molten plastic is injected into the injection-molding mold, and the second body 143 and the housing 133 of the ball joint 130 are insert-injection-molded to the first body 141 (ST 140). Since the molten plastic surrounds the inward and outward surfaces of the first, second, and third lateral reinforcement portions 1415a, 1415b, and 1415c of the second body 143 and the inward and outward surfaces of the first, second, and third extension portions 1419a, 1419b, and 1419c, and is then solidified, the first body 141 and the second body 143 can be firmly coupled to each other. At this time, the plurality of reinforcement ribs 1433 may be formed inside the second body 143. Further, the molten plastic flows to the plurality of first button holes 1413a and the plurality of second button holes 1413b to form the plurality of first button portions 1435a and the plurality of second button portions 1435b. Accordingly, it is possible to prevent the second body 143 from being separated from the first body 141 or from being shaken with respect to the first body 141.

The molten plastic filling the inside of the first body 141 flows into the space formed between the outer circumferential surface of the bearing member 131 and the inner circumferential surface of the reinforcement member 135 through the through-hole portion 1351 and is then solidified. Thus, the ball joint 130 may be formed integrally with the hybrid arm 100.

As described above, according to an embodiment of the present disclosure, the second body 143 and the housing 133 are insert-injection-molded to the first body 141 to which the reinforcement member 135 is coupled. Thus, the ball joint 130 may be formed integrally with the hybrid arm 100. Accordingly, the process of assembling the ball joint 130 is eliminated, thereby improving productivity and reducing manufacturing costs. Further, since a separate cap component for the ball joint 130 is not necessary, the weight of the hybrid arm 100 can be reduced.

While the embodiments of the present disclosure has been described in detail hereinbefore, the present disclosure is not limited thereto. Various modifications and improvements, which may be made by those of ordinarily skill in the art using the basic concept of the present disclosure defined in the appended claims, are intended to fall within the protection scope of the present disclosure.

What is claimed is:

1. A hybrid arm comprising:
a first body made of a metal material and formed with a plurality of end portions;
a second body formed so as to fill an inner side of the first body by being insert-injection-molded to the first body; and
a ball joint formed integrally at a first end portion among the plurality of end portions of the first body,
wherein the ball joint comprises:
a reinforcement member coupled to the first end portion;
a bearing member formed with a space therein;
a ball stud including a ball rotatably inserted into the space of the bearing member and a rod extending upward of the ball; and
a housing interposed between the reinforcement member and the bearing member and formed integrally with the second body by insert-injection-molding molten plastic,
wherein the first body and the second body have the shape of "λ",
wherein an opening is formed at a lower end of the reinforcement member,
wherein a concave portion is formed in an inner circumferential surface of the reinforcement member along a circumferential direction,
wherein the housing includes a protrusion that is formed within the concave portion such that the molten plastic is inserted into and solidified in the opening of the reinforcement member and the concave portion during insert-injection-molding, and
wherein the housing supports an outer circumferential surface of the bearing member and surrounds the inner circumferential surface, the lower end and an outer circumferential surface of the reinforcement member.

2. The hybrid arm of claim 1, wherein a through-hole portion is formed in the reinforcement member to face the inner side of the first body to allow molten plastic to pass through.

3. The hybrid arm of claim 1, wherein the bearing member includes a first bearing and a second bearing,
wherein a first protrusion portion, an inner circumferential surface of which protrudes upward, is formed in one of the first and second bearings, and
wherein a second protrusion portion, which corresponds to the first protrusion portion and an outer circumferential surface of which protrudes downward, is formed in the other one of the first and second bearings.

4. The hybrid arm of claim 1, wherein an edge of the first body extends downward to form first and second lateral reinforcement portions,
   wherein a lower end of the first lateral reinforcement portion extends toward the inner side of the first body to form a first extension portion,
   wherein a lower end of the second lateral reinforcement portion extends toward the inner side of the first body to form a second extension portion, and
   wherein the first and second extension portions are formed in a shape that gradually increases in area toward the reinforcement member.

5. The hybrid arm of claim 4, wherein a first circular arc portion corresponding to an outer circumferential surface of the reinforcement member is formed at the first end portion of the first body,
   wherein a first bonding portion is formed at one side of the first lateral reinforcement portion so as to contact the outer circumferential surface of the reinforcement member,
   wherein a second circular arc portion corresponding to the outer circumferential surface of the reinforcement member is formed at one side of the first extension portion,
   wherein a second bonding portion is formed at one side of the second lateral reinforcement portion so as to contact the outer circumferential surface of the reinforcement member, and
   wherein a third circular arc portion corresponding to the outer circumferential surface of the reinforcement member is formed at one side of the second extension portion.

6. The hybrid arm of claim 5, wherein the reinforcement member is welded to the first circular arc portion, the first bonding portion, the second circular arc portion, the second bonding portion, and the third circular arc portion.

7. The hybrid arm of claim 5, wherein the second body is formed so as to surround inward and outward surfaces of the first and second lateral reinforcement portions and inward and outward surfaces of the first and second extension portions.

8. The hybrid arm of claim 7, wherein the second body is formed of a material different from the first body, and a plurality of reinforcement ribs extending downward are provided in an inner side of the second body.

9. The hybrid arm of claim 1, wherein a plurality of button holes are formed in the first body, and
   wherein when the second body is insert-injection-molded with the first body, a plurality of button portions integrally coupled to the plurality of button holes are formed.

10. A method of manufacturing a hybrid arm which includes a first body made of a metal material and formed with a plurality of end portions, a second body formed to fill an inner side of the first body, and a ball joint formed integrally at a first end portion among the plurality of end portions of the first body, the method comprising:
    forming the first body by processing a metal plate material;
    coupling a reinforcement member to the first end portion of the first body;
    fixing a rod of a ball stud such that an outer circumferential surface of a bearing member is spaced apart from an inner circumferential surface of the reinforcement member; and
    insert-injection-molding the second body and a housing of the ball joint to the first body,
    wherein the first body and the second body have the shape of "λ",
    wherein an opening is formed at a lower end of the reinforcement member,
    wherein a concave portion is formed in an inner circumferential surface of the reinforcement member along a circumferential direction,
    wherein during insert-injection-molding, the housing is interposed between the reinforcement member and the bearing member and is formed integrally with the second body by molten plastic,
    wherein, during insert-injection-molding, the molten plastic is inserted into and solidified in the opening of the reinforcement member and the concave portion, and
    wherein the housing supports an outer circumferential surface of the bearing member and surrounds the inner circumferential surface, the lower end and an outer circumferential surface of the reinforcement member.

11. The method of claim 10, wherein a through-hole portion is formed in the reinforcement member to allow molten plastic to pass through, and
    wherein coupling the reinforcement member to the first end portion of the first body comprises welding the reinforcement member to the first end portion of the first body such that the through-hole portion faces the inner side of the first body.

12. The method of claim 10, wherein forming the first body by processing the metal plate material comprises:
    forming first and second lateral reinforcement portions extending downward of the first body by processing an edge of the metal plate material; and
    forming first and second extension portions by processing lower ends of the first and second lateral reinforcement portions.

* * * * *